(12) United States Patent
Myers et al.

(10) Patent No.: US 11,932,505 B2
(45) Date of Patent: Mar. 19, 2024

(54) MACHINE FOR UNSTACKING OBJECTS

(71) Applicant: L&P Swiss Holding GmbH, Wittenbach (CH)

(72) Inventors: Terrance L. Myers, Joplin, MO (US); Kruno Kantoci, Petrijanec (HR)

(73) Assignee: L&P Swiss Holding GmbH, Wittenbach (CH)

(*) Notice: Subject to any disclaimer, the term of this patent is extended or adjusted under 35 U.S.C. 154(b) by 200 days.

(21) Appl. No.: 17/632,071

(22) PCT Filed: Aug. 4, 2020

(86) PCT No.: PCT/EP2020/071877
§ 371 (c)(1),
(2) Date: Feb. 1, 2022

(87) PCT Pub. No.: WO2021/028262
PCT Pub. Date: Feb. 18, 2021

(65) Prior Publication Data
US 2022/0250863 A1 Aug. 11, 2022

(30) Foreign Application Priority Data
Aug. 12, 2019 (EP) .................................. 19191220

(51) Int. Cl.
*B65H 3/32* (2006.01)
*B65H 3/04* (2006.01)
*B65H 5/02* (2006.01)

(52) U.S. Cl.
CPC .............. *B65H 3/32* (2013.01); *B65H 3/047* (2013.01); *B65H 5/021* (2013.01); *B65H 2701/174* (2013.01); *B65H 2701/176* (2013.01)

(58) Field of Classification Search
CPC .......... B65H 29/46; B65H 3/32; B65H 29/18; B65H 3/047; B65H 5/021;
(Continued)

(56) References Cited

U.S. PATENT DOCUMENTS 3,749,257 A * 7/1973 Yamashita ........... B65G 59/023
414/797.2
3,981,495 A * 9/1976 Bijttebier ................. B65H 3/22
271/18.3

(Continued)

FOREIGN PATENT DOCUMENTS

CN 107226355 A 10/2017
DE 1197903 B 8/1965
(Continued)

OTHER PUBLICATIONS

European Patent Office; Search Report and Written Opinion in related International Patent Application No. PCT/EP2020/071877 dated Nov. 2, 2020; 15 pages.

*Primary Examiner* — Gregory W Adams
(74) *Attorney, Agent, or Firm* — Wood Herron & Evans LLP

(57) ABSTRACT

A machine (100) for unstacking objects (10) includes a belt mechanism (110, 120, 121, 130) having a conveyor belt (110), a first drive mechanism (115) for driving the conveyor belt (110), a second drive mechanism (120, 121) for shifting the conveyor belt (110) between a forwarded position and a retracted position, and a third drive mechanism (130) for adjusting a height position of the conveyor belt (110). Further, the machine (100) includes a gripper mechanism (150, 160) having a gripper (150) and a fourth drive mechanism (160) for moving the gripper (150) between different height positions. A controller of the machine (100) is configured to control the gripper mechanism (150, 160) to grip an end portion of an uppermost object (10) of a stack (20) and lift the end of the uppermost object (10), to control the second drive mechanism (120, 121) and the third drive mechanism (130) to position a forward end of the conveyor belt (110) below the lifted end portion of the uppermost object (10), and to control the first drive mechanism (110)

(Continued)

and the second drive mechanism (120, 121) to operate in a coordinated manner by shifting the conveyor belt (110) towards the forwarded position while at the same time driving the conveyor belt (110) in a backwards direction to draw the uppermost object (10) onto the conveyor belt (110).

14 Claims, 7 Drawing Sheets

(58) Field of Classification Search
CPC ........ B65H 2701/174; B65H 2701/176; B65H 29/36; B65H 3/322; B65G 59/023; B65G 57/112; B65G 59/02; B65G 57/06
See application file for complete search history.

(56) References Cited

U.S. PATENT DOCUMENTS

| | | | | |
|---|---|---|---|---|
| 4,579,331 A * | 4/1986 | Nestler | ................... | B65H 3/22 |
| | | | | 271/18.3 |
| 4,605,216 A * | 8/1986 | DeWitt | ................... | B65H 3/22 |
| | | | | 271/18.3 |
| 4,684,120 A * | 8/1987 | Kamal | ................... | B65H 3/22 |
| | | | | 271/18.3 |
| 4,955,854 A * | 9/1990 | Roth | ...................... | B65H 5/021 |
| | | | | 493/357 |
| 5,039,078 A * | 8/1991 | Blessing | .................. | B65H 3/54 |
| | | | | 271/34 |
| 5,046,603 A * | 9/1991 | Odenthal | ............... | B65H 29/36 |
| | | | | 198/588 |
| 5,222,857 A * | 6/1993 | Hasegawa | ............ | B65G 59/023 |
| | | | | 414/797.3 |
| 5,265,712 A * | 11/1993 | Krieg | ................... | B65G 59/023 |
| | | | | 414/528 |
| 5,352,085 A * | 10/1994 | Sargent | .................. | B65H 3/322 |
| | | | | 414/796 |
| 5,524,747 A * | 6/1996 | Wohlfahrt | ............ | B65G 59/023 |
| | | | | 414/528 |
| 5,683,222 A * | 11/1997 | Ingelhag | .............. | B65G 59/023 |
| | | | | 414/801 |
| 8,960,244 B1 * | 2/2015 | Aylsworth | ............. | B65G 59/02 |
| | | | | 144/245.5 |
| 2010/0162694 A1 * | 7/2010 | Angleitner | ............ | B65G 61/00 |
| | | | | 198/782 |
| 2010/0278625 A1 | 11/2010 | Wolkerstorfer | | |
| 2016/0137435 A1 * | 5/2016 | Tanaka | ................... | B65G 65/00 |
| | | | | 414/800 |

FOREIGN PATENT DOCUMENTS

| | | | | |
|---|---|---|---|---|
| DE | 102011082967 A1 * | 3/2013 | ............. | B65H 3/322 |
| EP | 0686587 A1 | 12/1995 | | |
| EP | 2923975 A1 * | 9/2015 | ........... | B65G 59/005 |
| EP | 3020515 A1 | 5/2016 | | |
| EP | 3112311 A1 | 1/2017 | | |
| JP | S52105474 A | 9/1977 | | |
| WO | WO-2009043151 A1 * | 4/2009 | ............. | B25J 15/00 |

* cited by examiner

MACHINE FOR UNSTACKING OBJECTS

FIELD OF THE INVENTION

The present invention relates to a machine for unstacking objects and to a method of unstacking an object.

BACKGROUND OF THE INVENTION

In various industries, there is a need for stacking and unstacking objects. For example. such objects may correspond to finished products, intermediate products, or raw materials which are stacked for transport or storage. A specific example of such objects are mattresses and mattress cores.

For stacking mattresses, it is known to use automated processes which are based on using a conveyor belt to move a mattress to a stack. An example of such mechanism is described in CN 107226355 A.

However, removal of objects from a stack often requires human intervention and may result in laborious processes when handling mattresses or similar objects during removal from a stack.

Accordingly, there is a need for techniques which allow for efficiently removing objects from a stack objects.

BRIEF SUMMARY OF THE INVENTION

The present invention provides a machine according to claim 1 and to a method according to claim 10. The dependent claims define further embodiments.

Accordingly, an embodiment of the invention provides a machine unstacking objects. The machine comprises a belt mechanism having a conveyor belt, a first drive mechanism for driving the conveyor belt, a second drive mechanism for shifting the conveyor belt between a forwarded position and a retracted position, and a third drive mechanism for adjusting a height position of the conveyor belt. Further, the machine comprises a gripper mechanism having a gripper and a fourth drive mechanism for moving the gripper between different height positions. Further, the machine comprises a controller. The controller is configured to control the gripper mechanism to grip an end portion of an uppermost object of a stack and lift the end of the uppermost object.

Further, the controller is configured to control the second drive mechanism and the third drive mechanism to position a forward end of the conveyor belt below the lifted end portion of the uppermost object. Further, the controller is configured to control the first drive mechanism and the second drive mechanism to operate in a coordinated manner by shifting the conveyor belt towards the forwarded position while at the same time driving the conveyor belt in a backwards direction to draw the uppermost object onto the conveyor belt. In this way, the machine allows for reliably and precisely moving the object from the stack to the conveyor belt.

According to an embodiment of the machine, a speed of said shifting the conveyor belt towards the forwarded position and a speed of said driving the conveyor belt in the backwards direction are substantially the same. In this way, the conveyor belt can be moved under the uppermost object without substantial lateral movement of the object.

According to an embodiment of the machine, for releasing an object placed on the conveyor belt the controller is further configured to:

control the third drive mechanism to move the conveyor belt to a desired height position;

control the third drive mechanism to shift the conveyor belt towards the forwarded position and to position the object on the conveyor belt above a desired release position;

control the first drive mechanism and the second drive mechanism to operate in a coordinated manner by shifting the conveyor belt towards the retracted position while at the same time driving the conveyor belt in a forward direction to push the object over the forward end of the conveyor belt.

In this way, the object can be reliably and precisely released at a desired position, e.g., on the top of a stack of other objects. Accordingly, in some scenarios, the machine can be used both for stacking and unstacking of objects.

According to an embodiment of the machine, when releasing the object a speed of the shifting of the conveyor belt towards the retracted position and a speed of the driving of the conveyor belt in the forward direction are substantially the same. In this way, the conveyor belt can be removed from under the object without substantial lateral movement of the object.

According to an embodiment of the machine, the controller is further configured to control the second drive mechanism to shift the conveyor belt towards the retracted position if the uppermost object is fully drawn onto the conveyor belt. In this way, the conveyor belt can be used for conveying the object to other positions within or outside the machine.

According to an embodiment, the machine further comprises a height sensor configured to detect a height of the stack. The controller can then be further configured to control the third drive mechanism and the gripper mechanism depending on an input provided by the height sensor. In this way, the above process of lifting the end of the object can be controlled in a precise manner.

According to an embodiment, the height sensor operates on the basis of detecting mechanical contact with an upper surface of the stack. In this way, the height of the stack can be accurately detected also for at least partially transparent objects, like for example wire-coil mattress cores.

According to an embodiment of the machine, the second drive mechanism comprises a telescope mechanism for shifting the conveyor belt between the forwarded position and the retracted position. In this way, the machine may enable a high range of shifting of the conveyor belt between the forwarded position and the retracted position, e.g., to thereby efficiently enable handling of large-sized objects without excessively increasing size of the machine.

According to an embodiment, the gripper comprises one or more needles, one or more magnets, and/or one or more vacuum suction channels for gripping the end of the uppermost object. In this way, the gripper may be adapted to handle various types of objects.

According to a further embodiment of the invention, a method of unstacking an object is provided. The method may be performed by the above-mentioned machine. The method comprises:

by a gripper mechanism, gripping an end portion of an uppermost object of a stack and lifting the end of the uppermost object;

positioning a forward end of a conveyor belt below the lifted end portion of the uppermost object; and by shifting the conveyor belt towards a forwarded position while at the same time driving the conveyor belt in a backwards direction, drawing the uppermost object onto the conveyor belt.

In this way, the object can be reliably and precisely moved from the stack to the conveyor belt.

According to an embodiment of the method, wherein a speed of said shifting the conveyor belt towards the forwarded position and a speed of said driving the conveyor belt in the backwards direction are substantially the same. In this way, the conveyor belt can be moved under the uppermost object without substantial lateral movement of the object.

According to an embodiment of the method, the method may comprise releasing an object placed on the conveyor belt. This may be accomplished by:

moving the conveyor belt to a desired height position;
shifting the conveyor belt towards the forwarded position and positioning the object on the conveyor belt above a desired release position;
shifting the conveyor belt towards the retracted position while at the same time driving the conveyor belt in a forward direction to push the object over the forward end of the conveyor belt.

In this way, the object can be reliably and precisely released at a desired position, e.g., on the top of a stack of other objects.

According an embodiment of the method, when releasing the object a speed of the shifting of the conveyor belt towards the retracted position and a speed of the driving of the conveyor belt in the forward direction are substantially the same. In this way, the conveyor belt can be removed from under the object without substantial lateral movement of the object.

According to an embodiment of the method, the conveyor belt is shifted towards the retracted position if the uppermost object is fully drawn onto the conveyor belt. In this way, the conveyor belt can be used for conveying the object to other positions within or outside the machine.

According to an embodiment of the method, the gripper mechanism is controlled depending on an input of a height sensor which operates on the basis of detecting mechanical contact with an upper surface of the stack. In this way, the height of the stack can be accurately detected also for at least partially transparent objects, like for example wire-coil mattress cores.

In any of the above embodiments of the machine or method, the objects may comprise mattresses or mattress cores. However, the machine or method could also be applied to other objects that are flexible and have a flat shape, such as foam panels, plastic panels, cardboard panels, textile sheets, or the like.

BRIEF DESCRIPTION OF DRAWINGS

Embodiments of the invention will be described with reference to the accompanying drawings.

DETAILED DESCRIPTION OF EMBODIMENTS

Exemplary embodiments of the invention will be described with reference to the drawings. In particular, a machine unstacking and optionally also stacking of objects and operations of the machine will be described. In the following detailed description the objects are assumed to be mattresses. However, it is noted that the machine could also be utilized for handling of mattress parts, e.g., mattress cores formed open innerspring units, of pocketed coils, and/or foam elements. Further, the objects could also correspond to various other types of objects, e.g., foam panels, plastic panels, cardboard panels, or textile sheets. In some scenarios, such different types of object could also be combined in a single stack. Typical thicknesses of the objects, along a direction perpendicular to the stack, are in the range of 1 cm to 30 cm. The lateral dimensions of the objects may be up to a few meters. Further, it is noted that the features of different embodiments may be combined with each other unless specifically stated otherwise.

Figure 1A:
FIGS. 1A and 1B schematically illustrate a stack of objects which may be unstacked according to an embodiment of the invention.
Figure 1B:
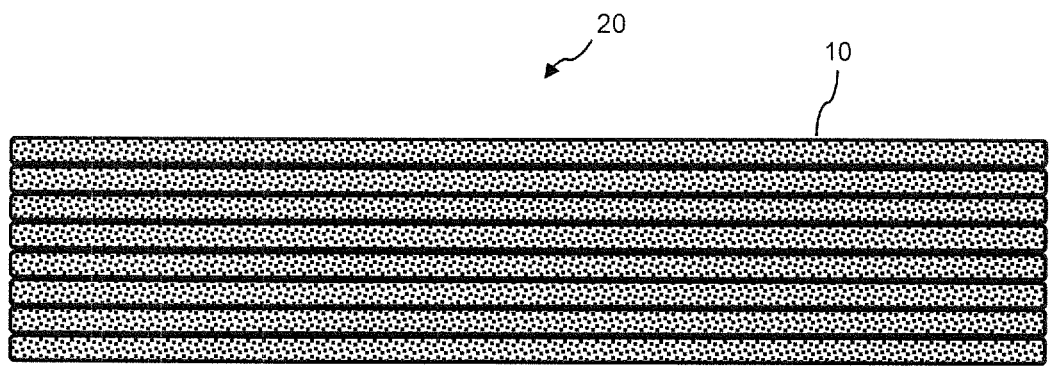

FIG. 1A shows a sectional view for illustrating a mattress 10. The mattress 10 has a generally flat shape and is typically flexible. These properties need to be considered when handling the mattress 10, e.g., when stacking multiple mattresses 10 for storage or transportation, as shown in FIG. 1B for exemplary stack 20. As further explained below, the machine of the illustrated concepts allows for implementing unstacking mattresses 10 from the stack 20 in an automated manner.

Figure 2:
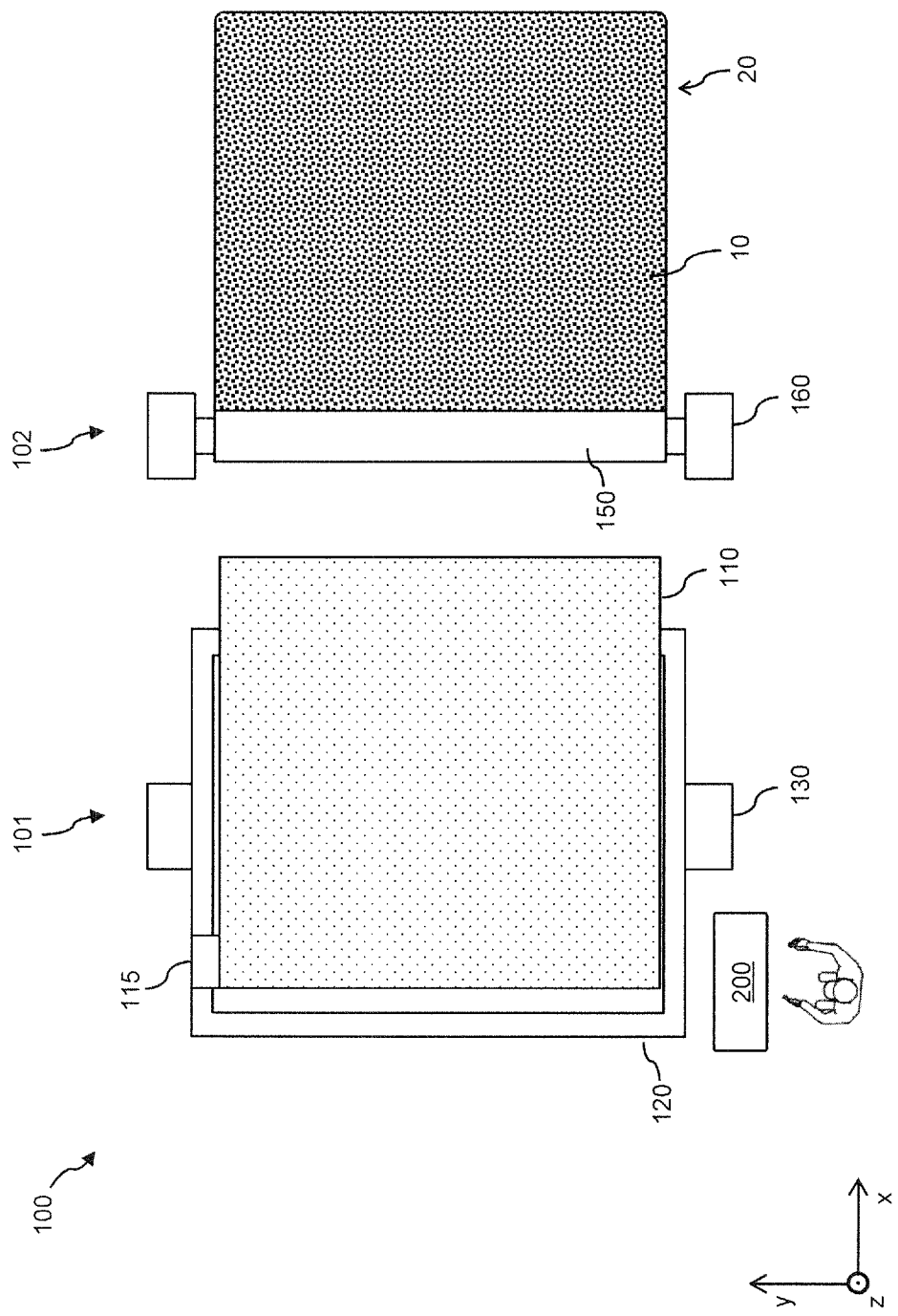
FIG. 2 schematically illustrates a top view of a machine according to an embodiment of the invention.

FIG. 2 shows a schematic top view for illustrating a machine 100 for unstacking objects, e.g., from a stack 20 as illustrated in FIGS. 1A and 1B. The machine 100 allows for automating processes of removing one or more of the objects 10, in the illustrated example assumed to be mattresses, from the stack 20. As further explained below, the machine 100 may also be used for stacking objects.

As illustrated, the machine 100 includes a first section 101 and a second section 102. The first section 101 includes a belt mechanism with a conveyor belt 110, a horizontal shift mechanism 120, and a vertical drive mechanism 130. The conveyor belt 110 is driven by a motor 115, e.g., an electric motor, coupled to one or more rollers supporting the conveyor belt 110. The conveyor belt 110 has a horizontal conveying direction, along an x-direction as illustrated in FIG. 2. A length of the conveyor belt 110 along the x-direction may correspond to a length of the objects 10 to be handled by the machine 100, or be larger. A width of the conveyor belt, along a y-direction as illustrated in FIG. 2, may correspond to a width of the objects 10 to be handled by the machine 100, or be larger.

The horizontal shift mechanism 120 allows for shifting the conveyor belt 110 along the conveying direction, i.e., along the x-direction. A range of this shifting is between a retracted position, in which the conveyor belt 110 is in the area of the first section 101, and a forwarded position, in which the conveyor belt 110 is in the area of the second section 101. Specifically, the horizontal shift mechanism 120 allows for bringing the conveyor belt 110 into a horizontal position which is vertically substantially aligned with the stack 20. The horizontal shift mechanism 120 may be based on a chain drive and/or a rack drive and be driven by an electric motor (not illustrated). As further explained below, the horizontal shift mechanism 120 may include a telescope mechanism.

The vertical drive mechanism 130 allows for moving the conveyor belt 110 between different height positions, i.e., along a z-direction as illustrated in FIG. 2. The vertical drive mechanism 130 may be based on a chain drive and/or a rack drive and be driven by an electric motor (not illustrated).

The second section 102 includes a gripper 150 and a vertical drive mechanism 160. As illustrated, the gripper 150 is placed over one end of the stack 20 and extends substantially over the entire width of the stack 20. This relative positioning may be achieved by positioning the stack 20 below the gripper 150. Alternatively or in addition, a drive mechanism could also be provided for moving the gripper 150 along the x-direction. The configuration of the gripper 150 may depend on the type of the objects 10 to be handled. For example, when handling mattresses like assumed in the illustrated example, the gripper 150 may be provided with needles for engaging a textile cover material or foam material of the mattress. A needle-based configuration of the gripper 150 may also be used when handling pocketed-coil mattress cores or open wire innerspring units. When handling objects including magnetic material like steel, such as innerspring units with steel coils, the gripper 150 could also be provided with magnets for engaging the object. When handling objects having a substantially smooth surface, such as plastic panels or cardboard panels, the gripper 150 could also be provided with vacuum channels for engaging the object 10 by vacuum suction effect.

The vertical drive mechanism 150 allows for moving the gripper 150 between different height positions, i.e., along the z-direction. The vertical drive mechanism 150 may be based on a chain drive and/or a rack drive and be driven by an electric motor (not illustrated).

As further illustrated, the machine 100 is provided with a control cabinet 200. The control cabinet 200 includes electronic control circuitry for controlling actions and processes performed by the machine 100 as described herein. Furthermore, the control cabinet 200 may also provide a user interface which allows an operator to initiate and/or configure such actions and processes.

Operation and interaction of the above components of the machine 100 will now be further explained by referring to an exemplary unstacking process as illustrated by schematic side views of FIGS. 3A, 3B, 3C, and 3D.

Figure 3A:
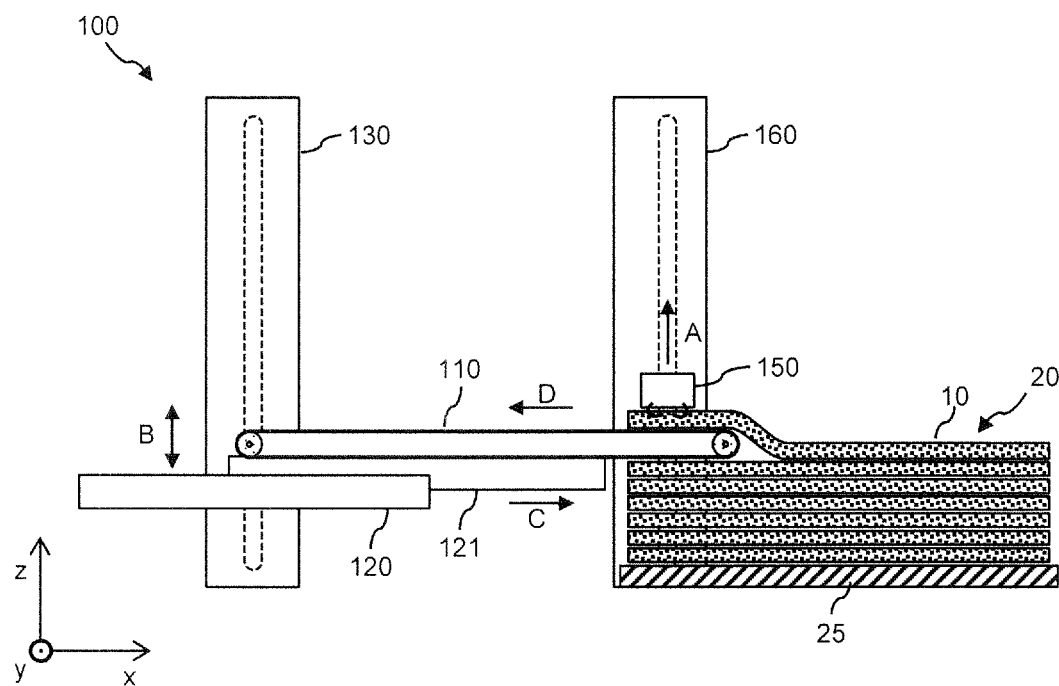
FIGS. 3A, 3B, 3C, 3D schematically illustrate an automated unstacking process performed by the machine.
Figure 3B:
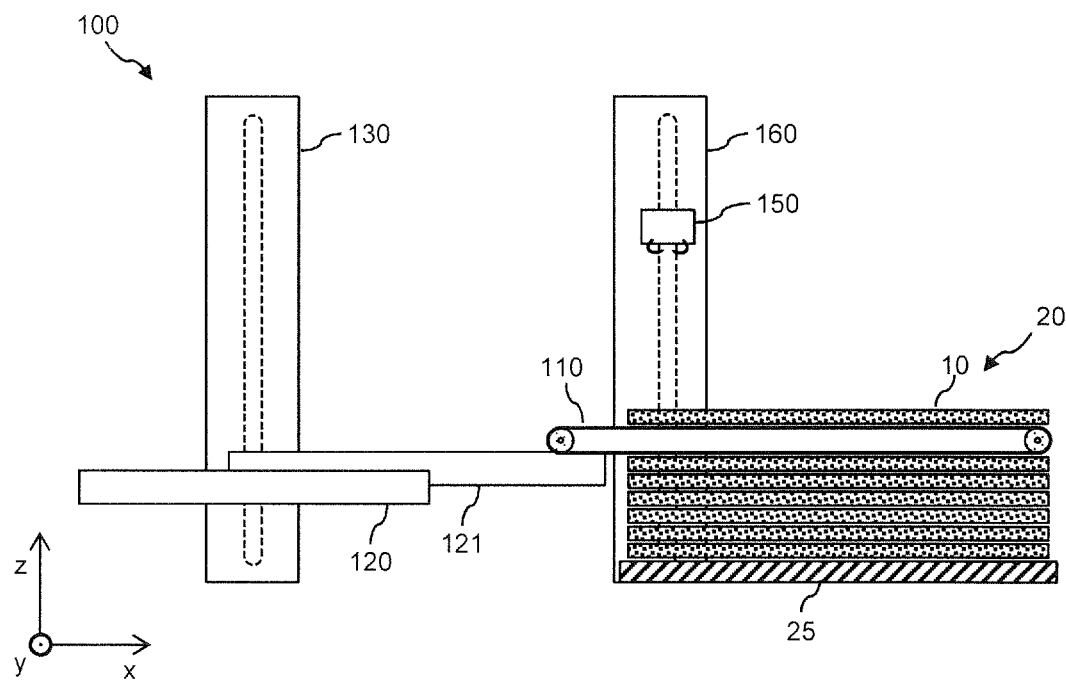

FIG. 3A illustrates a situation at the beginning of the unstacking process. As illustrated in FIG. 3A, the stack 20 may be positioned on a pallet 25, with one end of the stack 20 the arranged below the gripper 150. As illustrated by arrow A, the gripper 150 engages and lifts the end of the uppermost object 10 from the stack 20, thereby creating a space below the lifted and of the uppermost object 10. As illustrated by double headed arrow B, the conveyor belt 110 is set to a vertical position below the lifted end of the uppermost object 10. As further illustrated by arrow C, the conveyor belt 110 is being horizontally shifted towards the forwarded position, into the space below the lifted end of the uppermost object 10. Here, it is noted that the vertical position of the conveyor belt 110 is adjusted in such a way that the upper surface of the conveyor belt 110 makes contact with the lower surface of the uppermost object 10, but that contact of the conveyor belt 110 with the remaining objects of the stack 20 is avoided. As further illustrated by arrow capital D, the conveyor belt 110 is driven in a backward direction, corresponding to the negative x-direction, to draw the uppermost object 10 onto the conveyor belt 110. This driving of the conveyor belt 110 is coordinated with the horizontal shifting of the conveyor belt 110. In particular, the conveyor belt 110 is driven with a speed which substantially corresponds to the speed of horizontally shifting the conveyor belt 110. In this way, the conveyor belt 110 is advanced below the uppermost object 10, without any substantial movement of the uppermost object 10 along the x-direction, until the uppermost object 10 is fully drawn onto the conveyor belt 110, as illustrated in FIG. 3B. Here, it is noted that the gripper 150 may remain engaged with the uppermost object 10 throughout the process of drawing the uppermost object 10 onto the conveyor belt 110. However, it is also possible that the gripper 150 disengages from the uppermost object 10 when the forward end of the conveyor belt 110 is placed below the lifted and of the uppermost object 10, like illustrated in FIG. 3A.

Figure 3C:
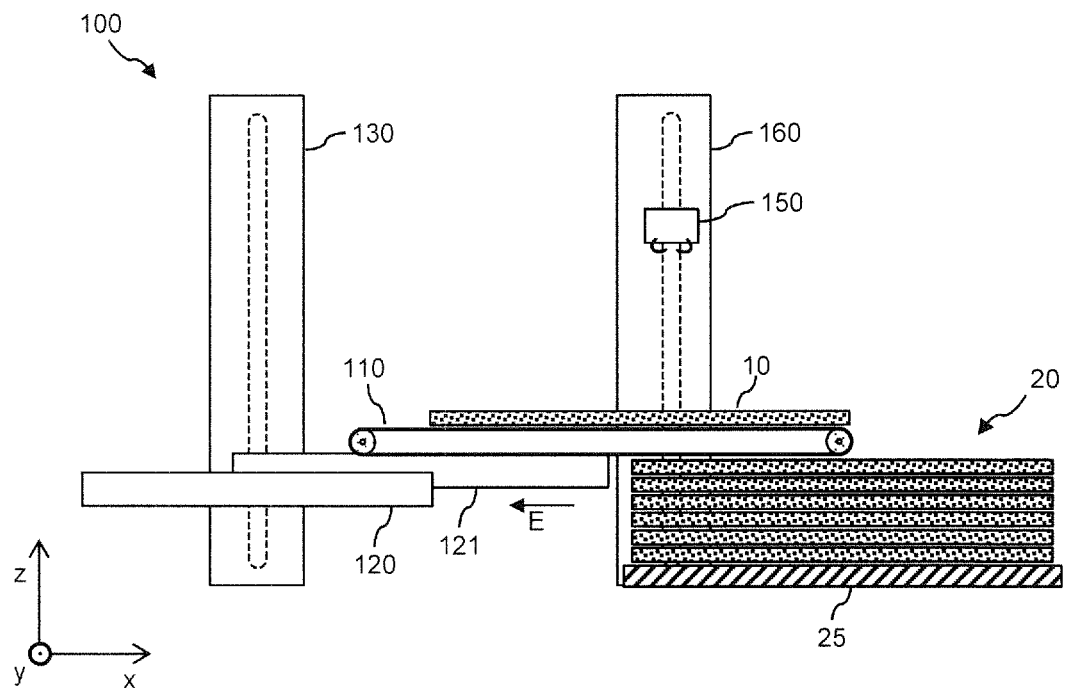
Figure 3D:
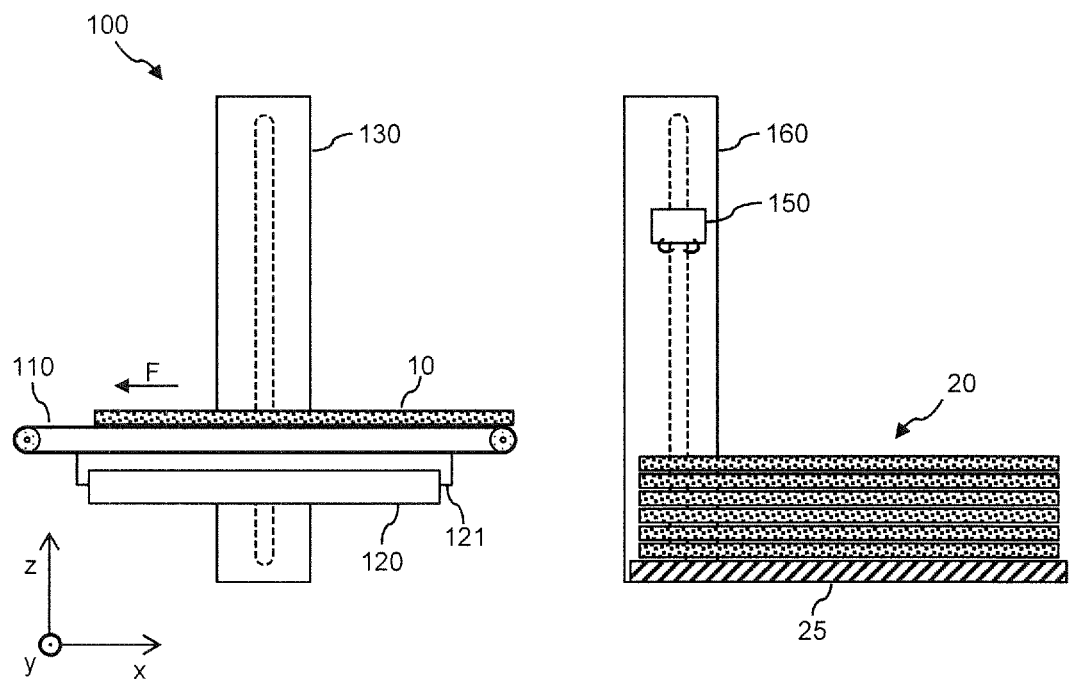

Once the uppermost object 10 is fully received on the conveyor belt 110, the conveyor belt 110 can be horizontally shifted back towards the retracted position, as illustrated by arrow E in FIG. 3C, until the conveyor belt 110 reaches the retracted position, as illustrated in FIG. 3D. The object 10 on the conveyor belt 110, which is removed from the stack 20, made then be further conveyed by driving the conveyor belt 110 in the backwards direction, as illustrated by arrow F. In this way, the object 10 may for example be conveyed to another processing stage within the machine 100 or outside the machine 100.

Figure 4A:
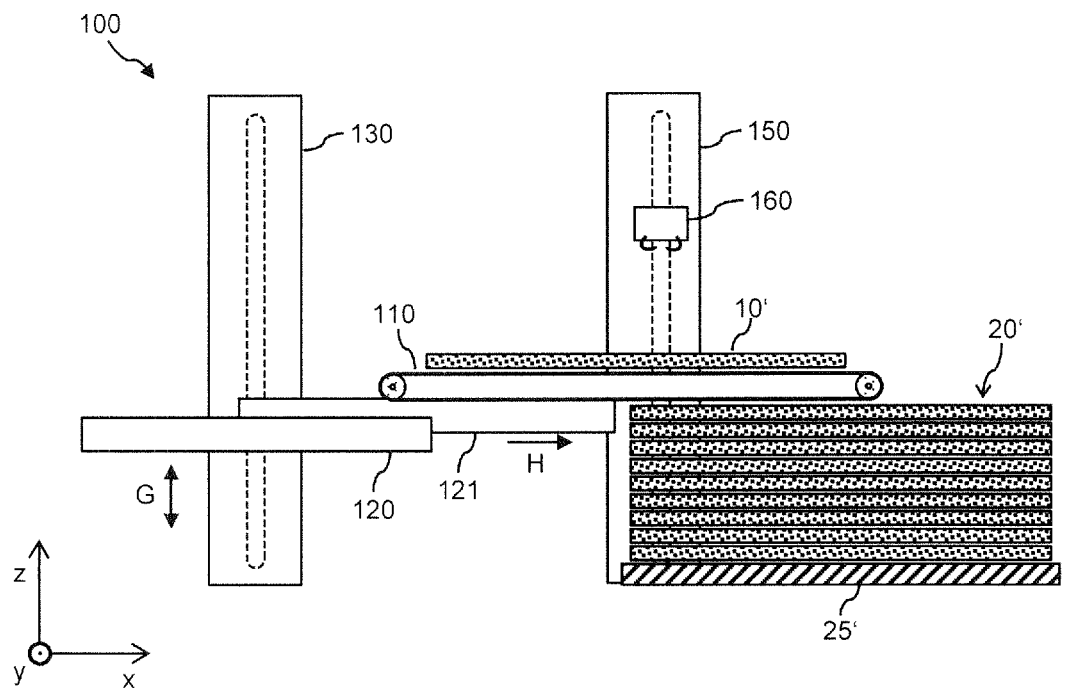
FIGS. 4A and 4B schematically illustrate a stacking process performed by the machine.
Figure 4B:
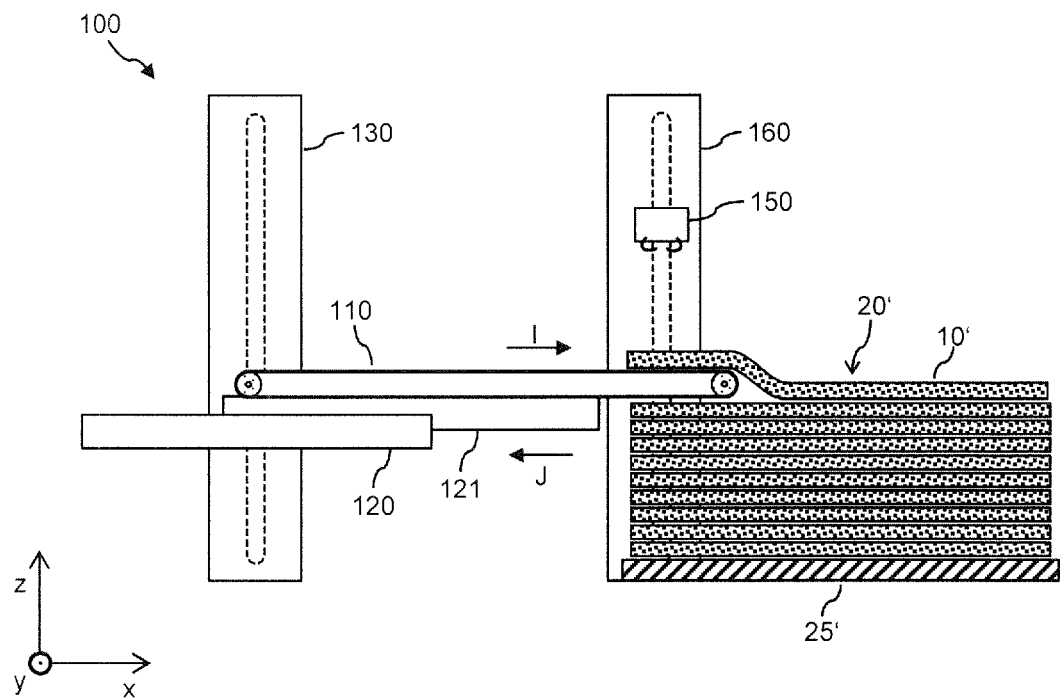

As mentioned above, the machine 100 may also be used for stacking objects. FIGS. 4A and 4B show schematic side views for schematically illustrating processes performed by the machine 100 when stacking an object 10' onto a stack 20'. Here, it is noted that similar processes could also be used for otherwise releasing the object 10' at a desired position. Before the processes of FIGS. 4A and 4B, processes like explained in connection with FIGS. 3A, 3B, 3C and 3C may have been used to place the object 10' on the conveyor belt 110, and the object 10' may have been subjected to other processing within the machine 100 or outside the machine 100. For example, the object 10' could correspond to the object 10, which was subjected to one or more further processing steps, such as packaging.

FIG. 4A illustrates a situation at the beginning of the stacking process. As illustrated in FIG. 4A, the stack 20' may be positioned on a pallet 25'. As illustrated by double-headed arrow G, the conveyor belt 110 is set to a vertical position above the upper surface of the stack 20'. As further illustrated by arrow H, the conveyor belt 110 is being horizontally shifted towards the forwarded position. Here, it is noted that the vertical position of the conveyor belt 110 is adjusted in such a way that contact of the conveyor belt 110 with the upper surface of the stack 20' is avoided. The conveyor belt 110 is horizontally shifted until the object 10' on the conveyor belt is vertically aligned with the stack 20'.

As illustrated by arrow I in FIG. 4B, the conveyor belt 110 is then driven in a forward direction, corresponding to the positive x-direction, to push the object 10' over the forward end of the conveyor belt 110. This driving of the conveyor belt 110 is coordinated with horizontal shifting of the conveyor belt 110 towards the retracted position, as illustrated by arrow J. In particular, the conveyor belt 110 is driven with a speed which substantially corresponds to the speed of horizontally shifting the conveyor belt 110. In this way, the conveyor belt 110 is retracted from below the object 10', without any substantial movement of the object 10' along the x-direction, until the conveyor belt 110 is fully removed from below the object 10' and the object 10' thus is placed on the stack 20'. Here, it is noted that the gripper 150 is not needed in the stacking process.

FIGS. 3A, 3B, 3C, 3D, 4A, and 4B also illustrate a telescopic mechanism for horizontally shifting the conveyor belt 110 between the forwarded position and the retracted position. As illustrated, the telescopic mechanism may be based on multiple elements 120, 121, 110 which are supported with respect to each other to enable relative horizontal movement. Specifically, a first element 120 is supported on the vertical drive mechanism 130, a second element 121 is supported on the first element 120 and horizontally movable with respect to the first element 120, and the conveyor belt 110 is supported on the second element 121 and horizontally movable with respect to the second element 121. The first element 120 and the second element 121 a for example correspond to nested rack frames.

Figure 5:
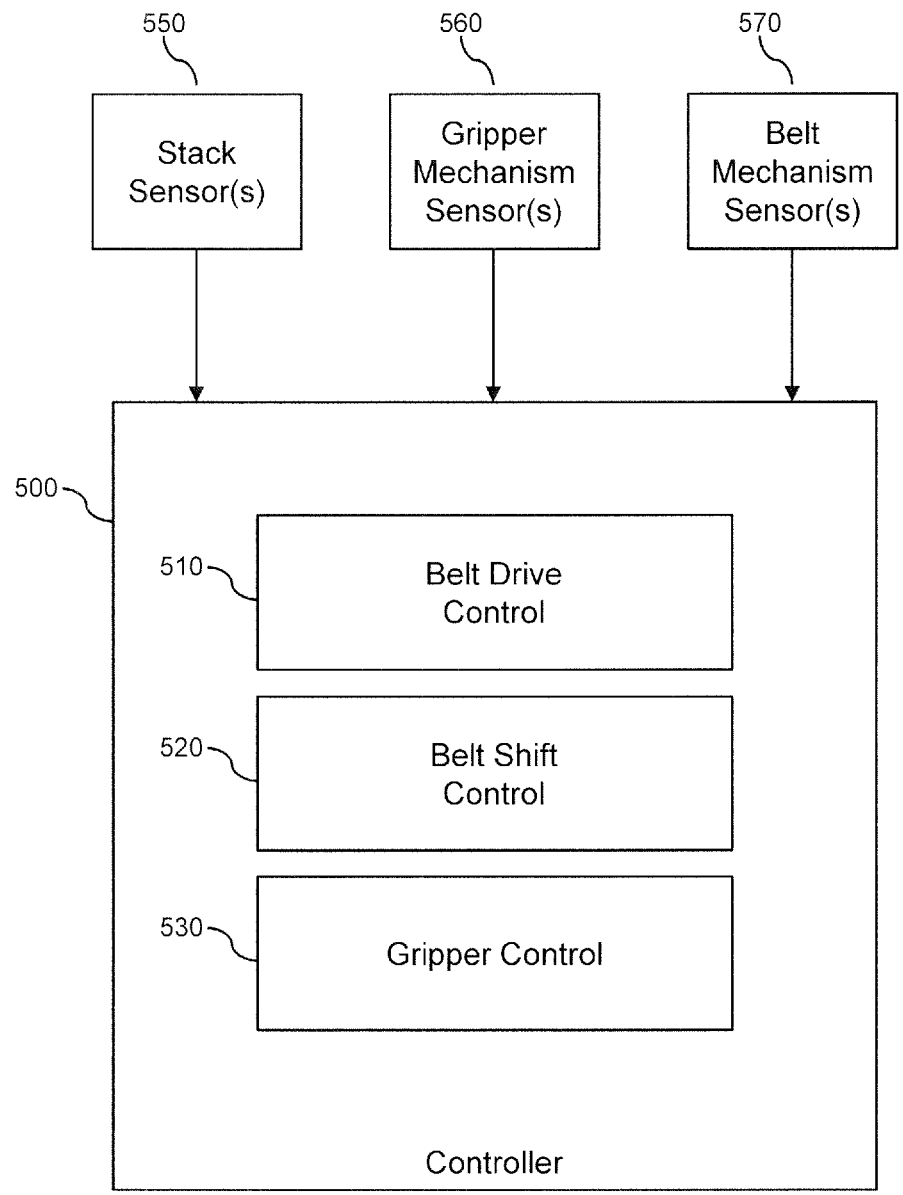
FIG. 5 schematically illustrates a control architecture of the machine.

FIG. 5 schematically illustrates a control architecture of the machine 100. As illustrated, the control architecture includes a controller 500 and sensors 550, 560, 570. The controller 500 may for example be implemented by the above-mentioned control cabinet 200.

As illustrated, the controller 500 is provided with multiple control modules, including a belt drive control module 510, a belt shift control module 520, and a gripper control module 530. The belt drive control module 510 implements the above-mentioned con-trot of driving the conveyor belt 110 in the forward direction and the backward direction.

The belt shift control module 520 implements the above-mentioned control of shifting the conveyor belt 110 between the retracted position and the forwarded position. The gripper control module 530 implements the above-mentioned control of the gripper 150, e.g., with respect to engaging and disengaging the object 10 and with respect to controlling the height position of the gripper 150. For controlling the driving of the conveyor belt 110, the horizontal shift mechanism 120, the vertical drive mechanism 130, the gripper mechanism 150, and the vertical drive mechanism 160, the controller 500 may provide corresponding drive or control signals to this mechanisms.

As further illustrated, the centers 550, 560, 570 may include one or more stack sensors 550, one or more gripper mechanism sensors 560, and one or more belt mechanism centers 570. These sensor may provide the controller 500 with input information for controlling the mechanisms.

The stack sensor(s) 550 may provide the controller 500 with information concerning the height of the stack 20, 20'. Based on this information, the controller 500 may set the vertical position of the conveyor belt 110 and also control the vertical position of the gripper 150. The stack sensor(s) 550 may include a mechanical sensor which senses the height of the stack 20, 20' by detecting mechanical contact of a sender element with the upper surface of the stack 20, 20'. Such mechanical detection may offer the benefit of being able to detect the height of the stack 20, 20' also in scenarios where the objects 10, 10' are at least partially transparent, such as for example open wire innerspring units. In addition or as an alternative, the stack sensor(s) 550 may also include optical sensors.

The gripper mechanism sensor(s) 560 may provide the controller 500 with information concerning the position and engagement status of the gripper 150. The gripper mechanism sensor(s) 560 may for example be based on encoders and/or optical sensors.

The belt mechanism sensor(s) 570 may provide the controller 500 with information concerning the position and movement status of the conveyor belt 110, the horizontal shift mechanism 120, and the vertical drive mechanism 130. The belt mechanism sensor(s) 570 may be based on encoders and/or optical sensors.

Figure 6:
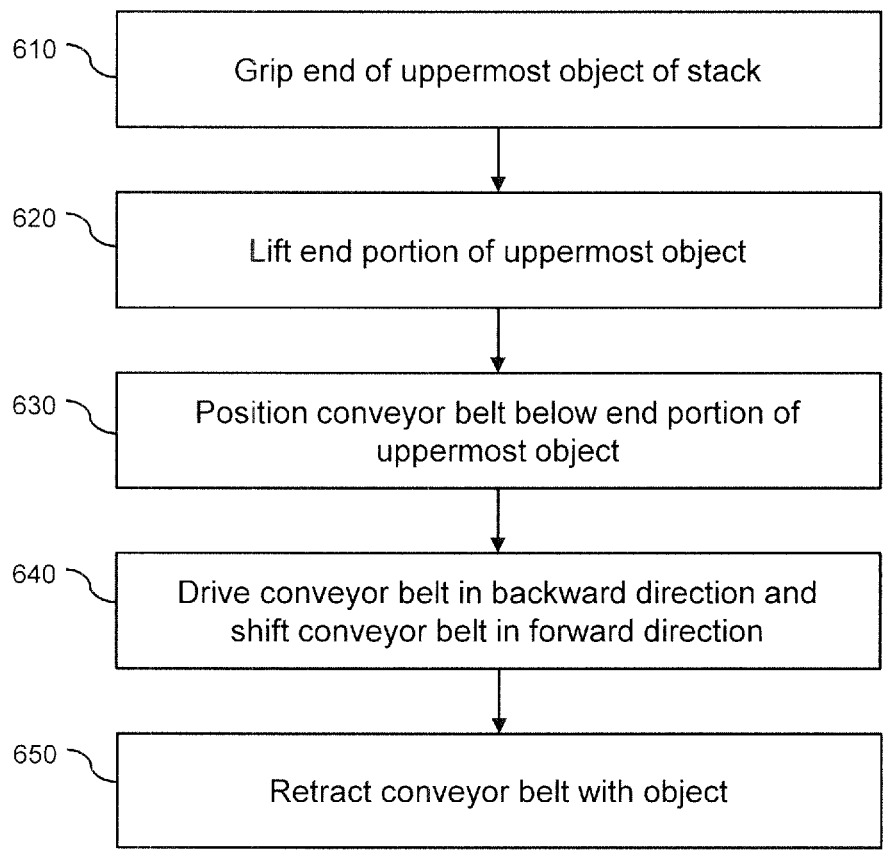
FIG. 6 shows a flowchart for illustrating a method according to an embodiment of the invention.

FIG. 6 shows a flowchart for illustrating a method of unstacking an object. The method of FIG. 6 may be performed by the above-described machine 100.

At block 610, a gripper mechanism, e.g., implemented by the above-mentioned gripper 150 and vertical drive mechanism 160 is used for gripping an end portion of an uppermost object of a stack. At block 620, the gripper mechanism is used for lifting the end of the uppermost object, e.g., as illustrated by arrow A in FIG. 3A. The gripper mechanism may be controlled depending on an input of a sensor which detects the height of the stack, e.g., a height sensor which operates on the basis of detecting mechanical contact with an upper surface of the stack, as for example explained in connection with the above-mentioned stack sensors 550.

At block 630, a forward end of the conveyor belt is positioned below the lifted end portion of the uppermost object, e.g., as illustrated by arrows B and C in FIG. 3A.

At block 640, the conveyor belt is shifted towards a forwarded position while at the same time driving the conveyor belt in a backwards direction, thereby drawing the uppermost object onto the conveyor belt, e.g., as illustrated by arrows C and D in FIG. 3A. As mentioned above, a speed of shifting the conveyor belt towards the forwarded position and a speed of driving the conveyor belt in the backwards direction are preferably substantially the same.

At block 650, if the uppermost object is fully drawn onto the conveyor belt, the conveyor belt 110 may be retracted by shifting the conveyor belt towards the retracted position.

It is to be understood that the illustrated machine 100 and its operations are susceptible to various modifications, without departing from the illustrated concepts. For example, while in the illustrated example the conveyor belt 110 is assumed to have a horizontal orientation, other orientations which are tilted with respect to the horizontal plane could be utilized as well. Further, the machine could also include a drive mechanism for laterally moving the conveyor belt 110, e.g., between different position along the y-direction. Further, the machine could also be provided with a mechanism for automatically handling the stack 20, 20', e.g., by moving the above-mentioned pallets 25, 25'. Still further, it is noted while in the above example the gripper mechanism 150, 160 was described as being supported separately from the conveyor belt mechanism 110, 120, 130, it is also conceivable to support the gripper mechanism 150, 160 on the same structure as the conveyor belt 110, e.g., on the same support as the roller supporting the forward end of the conveyor belt 110. Still further, it is noted that the illustrated machine 100 could be used for unstacking and optionally also stacking various types of objects, without limitation to the above mentioned examples.

The invention claimed is:

1. A machine for unstacking mattresses, mattress cores or foam panels, the machine comprising:
   a belt mechanism having a conveyor belt, a first drive mechanism for driving the conveyor belt, a second drive mechanism for shifting the conveyor belt between a forwarded position and a retracted position, and a third drive mechanism for adjusting a height position of the conveyor belt;
   a gripper mechanism having a gripper with needles and a fourth drive mechanism for moving the gripper between different height positions; and a controller, the controller being configured to:
  control the gripper mechanism to grip an end portion of an uppermost mattress, mattress core or foam panel of a stack by the needles and lift the end of the uppermost mattress, mattress core or foam panel,
  control the second drive mechanism and the third drive mechanism to position a forward end of the conveyor belt below the lifted end portion of the uppermost mattress, mattress core or foam panel, and
  control the first drive mechanism and the second drive mechanism to operate in a coordinated manner by shifting the conveyor belt towards the forwarded position while at the same time driving the conveyor belt in a backwards direction to draw the uppermost mattress, mattress core or foam panel onto the conveyor belt.

2. The machine according to claim 1,
wherein a speed of said shifting the conveyor belt towards the forwarded position and a speed of said driving the conveyor belt in the backwards direction are substantially the same.

3. The machine according to claim 1,
wherein for releasing a mattress, mattress core or foam panel placed on the conveyor belt the controller is further configured to:
  control the third drive mechanism to move the conveyor belt to a desired height position;
  control the third drive mechanism to shift the conveyor belt towards the forwarded position and to position the mattress, mattress core or foam panel on the conveyor belt above a desired release position;
  control the first drive mechanism and the second drive mechanism to operate in a coordinated manner by shifting the conveyor belt towards the retracted position while at the same time driving the conveyor belt in a forward direction to push the mattress, mattress core or foam panel over the forward end of the conveyor belt.

4. The machine according to claim 3,
wherein a speed of said shifting the conveyor belt towards the retracted position and a speed of said driving the conveyor belt in the forward direction are substantially the same.

5. The machine according to claim 1, further comprising:
a height sensor configured to detect a height of the stack,
wherein the controller is further configured to control the third drive mechanism and the gripper mechanism depending on an input provided by the height sensor.

6. The machine according to claim 5,
wherein the height sensor operates on the basis of detecting mechanical contact with an upper surface of the stack.

7. The machine according to claim 1,
wherein the controller is further configured to:
  if the uppermost mattress, mattress core or foam panel is fully drawn onto the conveyor belt, control the second drive mechanism to shift the conveyor belt towards the retracted position.

8. The machine according to claim 1,
wherein the second drive mechanism comprises a telescope mechanism for shifting the conveyor belt between the forwarded position and the retracted position.

9. The machine according to claim 1,
wherein the gripper comprises one or more needles, one or more magnets, and/or one or more vacuum suction channels for gripping the end of the uppermost object.

10. The machine according to claim 1,
wherein the machine is configured for unstacking flexible objects having a flat shape.

11. A method of unstacking mattresses, mattress cores or foam panels, the method comprising:
  by a gripper mechanism, gripping an end portion of an uppermost mattress, mattress core or foam panel of a stack by needles and lifting the end of the uppermost object;
  positioning a forward end of a conveyor belt into a space below the lifted end portion of the uppermost mattress, mattress core or foam panel; and
  by shifting the conveyor belt towards a forwarded position while at the same time driving the conveyor belt in a backwards direction, drawing the uppermost mattress, mattress core or foam panel onto the conveyor belt.

12. The method according to claim 11,
wherein a speed of said shifting the conveyor belt towards the forwarded position and a speed of said driving the conveyor belt in the backwards direction are substantially the same.

13. The method according to claim 11, further comprising:
  if the uppermost mattress, mattress core or foam panel is fully drawn onto the conveyor belt, shifting the conveyor belt towards the retracted position.

14. The method according to claim 11, further comprising:
  controlling the gripper mechanism depending on an input of a height sensor which operates on the basis of detecting mechanical contact with an upper surface of the stack.

* * * * *